United States Patent
Gabriel

(10) Patent No.: US 12,539,112 B2
(45) Date of Patent: Feb. 3, 2026

(54) SCREW-IN KNOTLESS SUTURE ANCHOR

(71) Applicant: DePuy Synthes Products, Inc., Raynham, MA (US)

(72) Inventor: Stefan Gabriel, Mattapoisett, MA (US)

(73) Assignee: Medos International Sarl, Le Locle (CH)

( * ) Notice: Subject to any disclaimer, the term of this patent is extended or adjusted under 35 U.S.C. 154(b) by 419 days.

(21) Appl. No.: 17/957,822

(22) Filed: Sep. 30, 2022

(65) Prior Publication Data

US 2024/0108323 A1   Apr. 4, 2024

(51) Int. Cl.
*A61B 17/04* (2006.01)

(52) U.S. Cl.
CPC .. *A61B 17/0401* (2013.01); *A61B 2017/0409* (2013.01); *A61B 2017/0414* (2013.01); *A61B 2017/0441* (2013.01); *A61B 2017/0445* (2013.01)

(58) Field of Classification Search
CPC ............ A61B 17/0401; A61B 17/0485; A61B 2017/00367; A61B 2017/00477; A61B 2017/0409; A61B 2017/0414; A61B 2017/044; A61B 2017/0441; A61B 2017/0445; A61B 2017/0456
USPC ........................................................ 606/232
See application file for complete search history.

(56) References Cited

U.S. PATENT DOCUMENTS

| | | | |
|---|---|---|---|
| 7,329,272 B2 | 2/2008 | Burkhart et al. | |
| 8,663,279 B2 | 3/2014 | Burkhart et al. | |
| 9,113,859 B2 | 8/2015 | Dooney, Jr. et al. | |
| 9,566,060 B2 | 2/2017 | Dougherty et al. | |
| 9,615,821 B2 | 4/2017 | Sullivan | |
| 9,770,240 B2 | 9/2017 | Dougherty et al. | |
| 10,045,770 B2 | 8/2018 | Burkhart et al. | |
| 10,383,618 B2 | 8/2019 | Gustafson et al. | |
| 10,582,922 B2 | 3/2020 | Lunn et al. | |
| 10,631,845 B2 | 4/2020 | Burkhart et al. | |
| 10,786,234 B2 | 9/2020 | Burkhart | |
| 10,842,478 B2 | 11/2020 | Hoeppner et al. | |
| 10,842,481 B2 | 11/2020 | Palese et al. | |
| 10,881,388 B2 | 1/2021 | Burkhart et al. | |
| 11,026,674 B2 | 6/2021 | Norton et al. | |

(Continued)

FOREIGN PATENT DOCUMENTS

| | | |
|---|---|---|
| WO | 2018048863 A1 | 3/2018 |
| WO | 2019014557 A1 | 1/2019 |

OTHER PUBLICATIONS

International Search Report and Written Opinion for Application No. PCT/EP2023/077267, mailed on Jan. 5, 2024, 15 pages.

*Primary Examiner* — Jocelin C Tanner
(74) *Attorney, Agent, or Firm* — Barnes & Thornburg LLP

(57) ABSTRACT

Various exemplary devices, systems, and methods for knotless suture anchor fixation are provided. In general, a suture anchor system is configured for knotless suture anchor insertion in a soft tissue repair surgical procedure. The inserter tool is configured to insert an anchor and an implant into a bone of a patient to secure a soft tissue relative to the bone. A suture is releasably coupled to a distal eyelet of the inserter tool and is captured by an implant that is advanced along an inner shaft of the shaft and secured by the suture anchor into the bone hole. The distal eyelet and implant are aligned with one another to position, capture, and secure the suture in the bone hole.

18 Claims, 18 Drawing Sheets

(56) References Cited

U.S. PATENT DOCUMENTS

| | | |
|---|---|---|
| 11,116,493 B2 | 9/2021 | Palese et al. |
| 2013/0144334 A1* | 6/2013 | Bouduban .......... A61B 17/0401 |
| | | 606/232 |
| 2015/0245901 A1* | 9/2015 | Dougherty ............ A61F 2/0805 |
| | | 606/232 |
| 2017/0000476 A1 | 1/2017 | Dougherty et al. |
| 2019/0090868 A1 | 3/2019 | Bracy et al. |
| 2019/0380692 A1 | 12/2019 | Brazil et al. |
| 2020/0155140 A1* | 5/2020 | Palese ................ A61B 17/0401 |
| 2020/0170634 A1 | 6/2020 | Burkhart et al. |
| 2021/0338225 A1 | 11/2021 | Patel et al. |
| 2021/0378656 A1 | 12/2021 | Palese et al. |

* cited by examiner

SCREW-IN KNOTLESS SUTURE ANCHOR

FIELD

The present disclosure generally relates to knotless suture anchors.

BACKGROUND

A variety of injuries and conditions require repair of soft tissue damage, or reattachment of soft tissue to bone and/or surrounding tissue. For example, when otherwise healthy tissue has been torn away from a bone, such as a labrum tearing away from a glenoid (shoulder instability), surgery is often required to reattach the tissue to the bone, to allow healing in the proper position to occur. A number of devices and methods have been developed for performing these surgical repairs. Some of the more successful methods including the use of suture fixation members, such as suture anchors, which typically include an anchor body having a suture attachment feature and a tissue or bone engaging feature for retaining the suture anchor within or adjacent to the tissue or bone. Depending on the specific injury, one or more suture anchors connected to, or interconnected by, one or more segment of suture, may be used to perform the repair.

Surgery can also be required when a tear occurs in the substance of a single type of tissue. Sutures can also be used in conjunction with one or more suture anchors to repair such tissue tears. Sutures can be fastened to suture anchors and to tissue using knots tied by the surgeon during a repair procedure, or using "knotless" devices and methods, where one or more anchors and one or more sutures can be connected and tensioned without the surgeon needing to tie knots during the surgery. Knotless anchoring is of particular utility for minimally invasive surgeries, such as endoscopic or arthroscopic repairs, where the surgeon remotely manipulates the suture at the surgical site using tools inserted through a small diameter cannula, an endoscopic tube, or otherwise percutaneously, which can make the knotting process difficult and tedious. Furthermore, the knot itself can be irritating to surrounding tissues. However, while knotless anchors can be very effective in reattaching soft tissue to bone, the small size of the anchor and patient anatomy can make it difficult to locate and insert the anchor into the bone hole. Additionally, visualization of the hole can be difficult due to challenging angles and the tight nature of the joint space.

Accordingly, there remains a need for improved devices, systems, and methods for knotless anchors.

SUMMARY

In general, devices, systems, and methods for knotless suture anchor technology are provided.

In one aspect a suture anchor system is provided that in one embodiment includes a cannulated suture anchor having at least one driven feature and at least one bone-engaging feature disposed on an external surface thereof. The cannulated inserter member has a lumen extending therethrough and is configured to be removably disposed within the lumen of the suture anchor. The inserter member has at least one drive feature disposed thereon that is configured to engage the driven feature of the suture anchor. The suture anchor system also includes a saddle implant distal to the suture anchor. The saddle implant includes at least one aligning feature disposed in a lumen thereof. The saddle implant includes a distal end having a suture seating groove. The saddle implant is configured to be mounted distally adjacent to the suture anchor and to be rotatable relative to the suture anchor. The suture anchor system also includes an inner shaft configured to be removably disposed within the lumen of the inserter member. The inner shaft has at least one aligning feature on an external surface thereof and a distal eyelet fixed at the distal end thereof. The distal eyelet has an opening and is configured to be rotationally fixed relative to the saddle implant and to be rotatable relative to the suture anchor.

The surgical system can vary in any number of ways. For example, the aligning feature of the saddle implant can include two flat and two rounded sides.

For another example, the suture seating groove of the saddle implant can be a saddle-shaped feature. The saddle-shaped feature can have a base and two distally extending projections, each distally extending projection having a flat distal-facing surface.

For yet another example, the saddle implant can be removably mountable on the inner shaft.

For still another example, wherein the eyelet can be defined by two arms. The arms can have a tapered shape.

For another example, the eyelet can be formed of a flexible material.

For yet another example, the eyelet can be removable through the lumens of the saddle insert and the suture anchor.

For still another example, an external profile of the eyelet can correspond to a geometry of an inner surface of the saddle insert and an outer surface of the inner shaft.

For another example, the eyelet can be configured to release sutures upon retraction of the inner shaft.

For yet another example, the suture anchor system can also include a handle with multiple pieces. The handle can have a cleat on one of the multiple pieces. The cleat can maintain a predetermined distance from the eyelet during insertion.

For still another example, the suture anchor system can also include a threader tab. The threader tab can include a clip configured to be attached to the inserter member.

For another example, the bone-engaging feature disposed on the external surface of the cannulated suture anchor can include threads. The threads can include two different thread configurations.

In another aspect, a method for attaching soft tissue to bone is provided that in one embodiment includes securing at least one operative suture to a soft tissue to be reattached to bone. The method also includes passing suture limbs of the at least one operative suture through an eyelet of a suture anchor system, the eyelet extending from an inner shaft disposed within a suture anchor construct having an inserter member with a lumen extending therethrough within which the inner shaft is disposed, a cannulated suture anchor mounted upon the inserter member, and a saddle implant mounted on the inner shaft distally adjacent to the suture anchor. The method also includes placing the inner shaft within a bone hole adjacent the soft tissue to be reattached to bone. The method also includes tensioning the operative suture to bring the soft tissue into secure engagement with bone. The method also includes driving the suture anchor and the saddle implant into the bone hole to engage bone while maintaining alignment of the saddle implant and the eyelet relative to each other. The method also includes releasing the operative suture from the eyelet. The method also includes removing the inner shaft.

The surgical method can vary in any number of ways. For example, the method can also include securing an operative suture on a cleat on a handle of the suture anchor system. The method can also include maintaining tension on the operative suture throughout insertion. The method can also include maintaining a predetermined distance between the cleat and the eyelet throughout insertion.

For another example, the method can also include capturing the operative suture with the saddle implant.

For yet another example, releasing the operative suture from the eyelet can include passing the suture between two arms of the eyelet.

For still another example, releasing the operative suture from the eyelet can include flexing the arms of the eyelet.

For another example, driving the suture anchor and the saddle implant can include rotating the suture anchor and distally translating the saddle implant.

BRIEF DESCRIPTION OF THE DRAWINGS

This disclosure will be more fully understood from the following detailed description taken in conjunction with the accompanying drawings, in which.

DETAILED DESCRIPTION

Figure 1A:
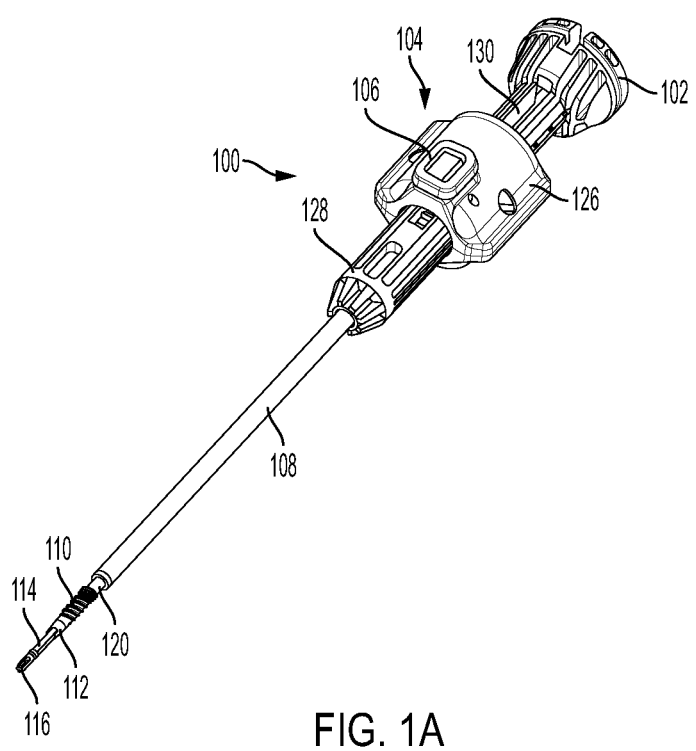
FIG. 1A is a perspective view of an embodiment of a knotless suture anchor fixation system, including a knotless suture anchor and a delivery tool.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices, systems, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used.

Various exemplary devices, systems, and methods for knotless suture anchor fixation are provided. In general, an inserter tool is configured for knotless anchor insertion in a soft tissue repair surgical procedure. The inserter tool is configured to insert an anchor and an implant into a bone of a patient to secure a soft tissue relative to the bone. A suture coupled to the soft tissue is secured relative to the bone by being trapped between an exterior surface of the anchor and a bone surface defining a hole in the bone in which the anchor is positioned. The suture passes into the bone hole along the exterior surface of the anchor, passes between the projections of the saddle implant, and out of the bone hole along the outer surface of the anchor therefore allowing the suture to be secured in position without needing to be knotted. Knotting can be time consuming and/or difficult to perform during surgery because of small suture diameter, limited working area at a joint space, a wet surgical environment, and/or limited visualization at the surgical site due to challenging angles and the tight nature of the joint space.

The inserter tool is configured to have each of the suture, the suture anchor, and the saddle implant releasably coupled thereto and, with the suture, the suture anchor, and the saddle implant releasably coupled thereto, to insert the suture, the suture anchor, and the saddle implant into the bone hole. The inserter tool is configured to position the suture in the bone hole before the suture anchor and the implant are secured in the bone hole. In an exemplary embodiment, the inserter tool includes a distal eyelet configured to releasably retain the suture therein, and the saddle implant includes a pair of projections configured to seat the suture therein. The distal eyelet and the saddle implant are configured to cooperate with one another to orient the suture with respect to the saddle implant and the inserter tool before the saddle implant and the anchor are secured in the bone hole. The anchor and the implant may be advanced together into position relative to a bone in which the anchor and implant will be secured after the implant captures the suture from the distal eyelet. The inserter tool is configured to move relative to the anchor and the saddle implant so that the saddle implant is configured to capture the suture from the distal eyelet of the inserter tool. The suture may thus be tensioned and positioned in the bone hole before the saddle implant and anchor secure the suture within the bone hole.

The inserter tool is configured to advance the suture anchor into the bone hole by rotating the inserter tool so that the threads of the suture anchor catch in the bone and advance the suture anchor in a distal direction into the bone hole. The saddle implant abuts the distal end of the anchor such that the saddle implant translates distally along the inner shaft as the anchor is advanced via rotation. After the suture anchor has been inserted into the bone, the inserter tool is configured to be longitudinally translated in a proximal direction to be removed from the patient's body with the anchor, the implant, and the suture remaining in the bone. Decoupling the inserter tool from the suture, the implant, and the suture anchor by longitudinally translating the inserter tool along its longitudinal axis may be less time consuming and/or may require less user-applied force than other methods of decoupling a tool from an implanted anchor that include rotating the tool about its longitudinal axis. Unlike longitudinally translating the inserter tool for removal, rotating the tool for removal can risk rotating the anchor and/or unintended off axis loading, which can cause the anchor to become less securely positioned in the bone and/or can cause damage to the suture and/or to the anchor.

The systems, devices, and methods described herein have applicability in a variety of surgical procedures for soft tissue repair, such as in a tissue repair surgical procedure at a joint such as a shoulder, a knee, or a hip.

FIGS. 1A-4C illustrate one embodiment of a knotless suture anchor fixation system 100 (also referred to herein as a "fixation device" or "fixation system"). In general, the fixation system 100 is configured to insert a suture anchor 110 and a saddle implant 112 into a bone of a patient to secure a soft tissue relative to the bone. The fixation process is shown in FIGS. 8A-8H. An inner lumen extends through the suture anchor 110 and the saddle implant 112 such that the suture anchor 110 and the saddle implant 112 are cannulated. A plurality of bone-engaging surface features 312 (shown in more detail in FIG. 3A) are configured to engage bone to retain the suture anchor 110 in the bone, e.g., to engage a surface of bone defining a hole in bone in which the suture anchor 110 is positioned. The saddle implant 112 is removably mounted on an inner shaft 114 of the knotless suture anchor fixation system 100. In the embodiments disclosed herein, the inner shaft 114 is depicted as a solid shaft. In other embodiments, the inner shaft 114 may have a lumen disposed therein. A distal eyelet 116 is positioned at a distal end of the inner shaft 114 and is configured to hold suture material therein.

The fixation system 100 includes an inserter tool having a rotatable knob 102 and a handle assembly 104. The handle assembly 104 includes an outer handle 126, a cleat 106, a threaded inner handle piece 122, and a toothed component 124. The outer handle 126 is configured to be held by hand during use of the inserter tool of the fixation system 100. In robotic surgical implementations, the outer handle 126 can be held by a mechanical member, such as a tool holder, of the robotic surgical system. The fixation system 100 also includes an inserter tool with an inserter member 108. An inserter shaft 118, which proceeds through the inserter member 108, functionally connects the inner shaft 114 with the toothed component 124 of the handle assembly 104. The handle assembly 104 includes a cleat 106 that is configured to releasably retain suture material thereon at a desired tension during the fixation procedure. The cleat 106 of the handle assembly 104 maintains a distance from the distal eyelet 116 as the rotatable knob 102 turns. This distance maintenance allows for a tension on the suture held by the distal eyelet 116 to be selected by a clinician by tethering the suture to the cleat 106. Maintenance of suture tension is discussed further with respect to FIG. 4 below. The handle assembly 104 moves relative to carrier 128 as the knob 102 is turned and the inner shaft 114 is retracted toward the knob 102.

The handle assembly 104 includes a toothed component 124 and a threaded inner handle piece 122 that interfaces with the toothed component 124 and the outer handle 126. An inserter shaft 118 has a proximal portion that fits into a slot of the toothed component 124. Rotating the knob while holding the outer handle 126 advances the suture anchor 110, withdraws the inserter shaft 118, and moves the outer handle 126 proximally. The teeth of the toothed component 124 interact with threads in the threaded inner handle piece 122 and advances the inserter shaft 118 translation at the same rate as the insertion of the suture anchor 110. A proximally extending portion 132 of the toothed component 124 extends within a slot 130 in the knob 102 and into the outer handle 126.

Figure 1B:
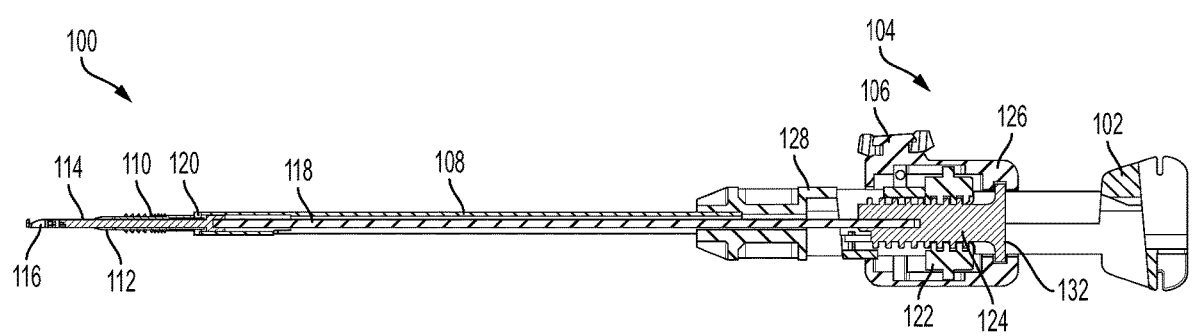
FIG. 1B is a cross-sectional view of the knotless suture anchor fixation system of FIG. 1A.

Referring to FIG. 1B, twisting the rotatable knob 102 causes the outer handle 126 and the threaded inner handle piece 122 to move relative to one another. Twisting the rotatable knob 102 also retracts inner shaft 114 and moves the outer handle 126 toward the rotatable knob 102. The outer handle 126, which has cleat 106 disposed thereon, maintains a distance from the distal eyelet 116 as the rotatable knob 102 turns. This distance maintenance allows for a tension on the suture held by the distal eyelet 116 to be selected by a clinician by tethering the suture to the cleat 106. The cleat 106 and maintenance of suture tension is discussed further with respect to FIG. 4 below.

Figure 2:
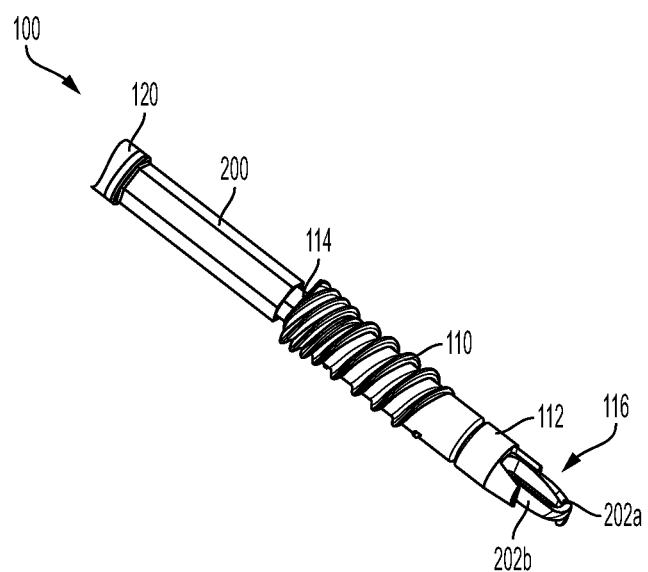
FIG. 2 is a perspective view of a distal portion of the knotless suture anchor fixation system of FIG. 1A with a cannulated suture anchor unseated from a hex-shaped portion of a shaft of the delivery tool.
Figure 3A:
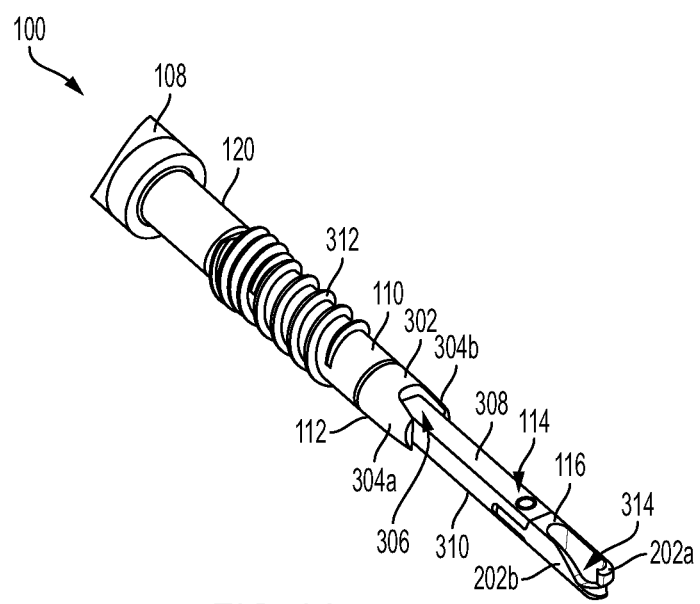
FIG. 3A is a perspective view of the distal portion of the knotless suture anchor fixation system of FIG. 1A with the cannulated suture anchor and saddle implant installed thereon.

FIG. 2 shows a perspective view of a distal end of the fixation system 100 with the suture anchor 110 and saddle implant 112 pushed distally toward the distal eyelet 116. The inserter member 108 has a portion 120 that has a smaller outer diameter than the rest of the inserter member 108 and abuts a hexagonally-shaped portion 200 (also called a "hex-shaped portion" herein) of the inserter member 108. The suture anchor 110 has a lumen with a hexagonally-shaped inner geometry (forming a driven feature) such that the suture anchor 110 can be seated on and driven by the hex-shaped portion 200 (a drive feature), as shown in FIG. 3A. The portion 120 of the cannulated inserter member 108 has an outer diameter larger than the inner hexagonal diameter of the suture anchor 110 such that the suture anchor 110 cannot slide proximally over the portion 120 of the inserter member 108. The inner shaft 114 and the distal eyelet 116 each have an outer diameter smaller than the inner diameters of the suture anchor 110 and the saddle implant 112 such that the suture anchor 110 and the saddle implant 112 slide distally over the inner shaft 114 and the distal eyelet 116 (including the arms of the distal eyelet 202a and 202b). The diameters of each component are shown in more detail in FIG. 3B.

Referring to FIG. 3A, the inner shaft 114 has a flat surface 308 and a curved surface 310 and extends into the cannulated inserter member 108. The distal eyelet 116 is fixed to the distal end of the inner shaft 114, and it has an outer profile with two flat sides and two curved surfaces mirroring the outer profile of the inner shaft 114 such that the saddle implant 112 is able to slide over the distal eyelet 116 and capture the suture held therein during insertion. The distal eyelet 116 has a plurality of arms 202a, 202b extending distally and forming an aperture 314 therebetween. In the embodiment of FIGS. 1A-4C, the aperture 314 of the distal eyelet 116 is formed by two arms, but any appropriate number of arms may be used in alternate embodiments, for example, three arms, four arms, etc., depending on the material and geometry selected for the arms. As noted above, the cannulated inserter member 108 has a hex-shaped portion 200 on which the suture anchor 110 is configured to be seated. The suture anchor 110 has a lumen extending therethrough that is correspondingly hex shaped such that rotation of the hex-shaped portion 200 of the cannulated inserter member 108 drives rotation of the suture anchor 110.

FIG. 3A is a perspective view of the distal portion of the knotless suture anchor fixation system of FIG. 1A with the cannulated suture anchor and saddle implant installed thereon. The bone-engaging surface features 312 can be in a variety of suitable forms but in an exemplary embodiment they include threads winding circumferentially around the suture anchor 110 along the longitudinal length of the suture anchor 110. The bone-engaging surface features 312 are also configured to engage a suture against the bone to help secure the suture relative to the bone. Suture anchor 110 includes two portions of threads. Proximally, a plurality of threads start at different locations around the circumference of the suture anchor 110. Four thread starts are positioned 90 degrees offset from one another circumferentially around the suture anchor 110. Two of those threads terminate in a proximal portion of the suture anchor 110 while the remaining two threads continue more distally, and terminate in the distal portion of the suture anchor 110. The result is that the number of bone-engaging features 312 per unit length of the anchor 110 is higher in the proximal portion of the anchor, where such a relatively higher resolution could be beneficial for engagement with bone of generally higher stiffness. A number of bone-engaging features 312 per unit length of the anchor 110 lower in the distal portion of the anchor, where such a relatively lower resolution could be beneficial for engagement with bone of generally lower stiffness.

The suture anchor 110 and the saddle implant 112 can be absorbable or non-absorbable. The suture anchor 110 and the saddle implant 112 can be made from any of a variety of materials, e.g., absorbable or non-absorbable polymers such as Polyether ether ketone (PEEK), Polylactic acid or polylactide (PLA), BIOCRYL®, BIOCRYL® RAPIDE®, Polyglycolic acid, Polycaprolactone, or blends of such polymers, or absorbable or non-absorbable other materials such as titanium, magnesium, bioglass, ceramic, carbon fiber, stainless steel, etc. The suture anchor 110 and the saddle implant 112 can be formed by a variety of techniques, for example by machining, molding, metal injection molding, overmolding, or by a post-molding process such as post-molding machining. The suture anchor 110 and the saddle implant 112 may be formed of the same or different materials and may be made using the same or different techniques.

The saddle implant 112 is positioned distal to suture anchor 110 and can rotate relative to the suture anchor 110. In use, the suture anchor 110 is driven by the hex-shaped portion 200 and rotates as it is driven into the bone. The saddle implant 112 is configured to maintain its rotational position relative to the inner shaft 114 and neither the saddle implant 112 nor the inner shaft 114 rotates with the suture anchor 110 and the hex-shaped portion 200. The saddle implant 112 has a base 302 and projections 304a, 304b. The projections 304a, 304b extend along the curved sides 310 of the inner shaft 114. The projections 304a, 304b and the base 302 form a suture seating groove 306 configured to capture suture material therein from the aperture 314 of the distal eyelet 116. The projections 304a, 304b can have flat distal faces and slanted sides extending between the base 302 and the distal faces of the projections 304a, 304b. The shape of the projections 304a, 304b and the base 302 form a saddle-shaped feature.

The aperture 314 of the distal eyelet 116 is formed between arms 202a, 202b. The arms 202a, 202b can have a tapered shape such that a height of each arm at that arm's distal tip is less than a height of the inner shaft 114, the height of the inner shaft being the distance from one flat side to the opposing flat side of the inner shaft 114. The arms 202a, 202b can also have a curved external shape consistent with the curved side of the inner shaft 114 from which they protrude. At a distal end of the distal eyelet 116, the arms 202a, 202b can overlap one another such that hook shapes formed in each arm 202a, 202b extend past a midline of a cross-section of the fixation device 100 (see the cross-sections shown in FIG. 3B) and stack on top of one another to form the aperture 314. This overlap aids in keeping the suture material within the distal eyelet 116 until the suture material is released by the arms 202a, 202b after being captured in the suture seating groove of the saddle implant during the insertion process. The insertion process is shown and discussed subsequently with respect to FIGS. 8A-8H.

The distal eyelet 116 can be made from any of a variety of materials, e.g., polymers such as Polyether ether ketone (PEEK), or other materials such as titanium, nitinol, magnesium, ceramic, carbon fiber, stainless steel, etc. The distal eyelet can be formed by a variety of techniques, for example by machining, molding, metal injection molding, overmolding, or by a post-molding process such as post-molding machining. The distal eyelet 116 may be formed of the same or different materials and may be made using the same or different techniques as the suture anchor 110 and the saddle implant 112.

Figure 3B:
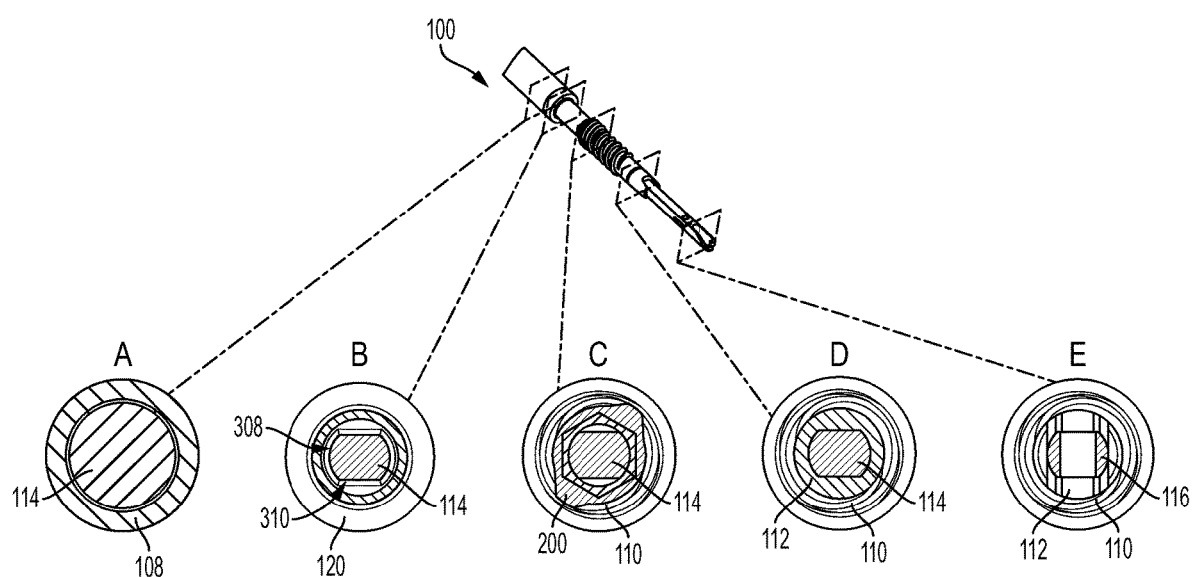
FIG. 3B is a perspective view and series of cross-sections of a distal portion of the knotless suture anchor fixation system of FIG. 1A.

FIG. 3B shows five cross sections, labeled A-E, of the knotless suture anchor fixation device 100 at varying positions along the device. Cross section A shows inserter member 108 and inner shaft 114. At this position along the inserter member 108, a proximal portion of the inner shaft 114 is shown which has a wider diameter than the distal portion of the inner shaft 114 so that the inner shaft 114 may interface with the inserter shaft 118. Proximally to cross section A, the inner shaft 114 forms a cup shape in which the inserter shaft 118 fits.

Cross section B shows the portion 120 surrounding the inner shaft 114. At this position, the inner shaft 114 has a cross section with two flat sides and two curved sides. Alternating flat surfaces 308 and curved surfaces 310 form the outer profile of the inner shaft 114.

Cross section C shows the hexagonal outer shape and the round profile of the inner cannula of the hex-shaped portion 200. The inner shaft 114 passes through the inner cannula of the hex-shaped portion 200 and can rotate relative to the inner cannula of the hex-shaped portion 200. The suture anchor 110 has a hex-shaped inner geometry such that the suture anchor 110 is configured to be seated on and driven by the hex-shaped portion 200.

Cross section D shows the saddle implant 112 seated on the inner shaft 114. The saddle implant has a flat-round-flat-round inner geometry to match the outer geometry of the inner shaft 114.

Cross section E shows that the saddle implant 112 and the distal eyelet 116 have the same flat-round-flat-round outer cross-sectional shape such that the saddle implant 112 is configured to slide over the distal eyelet 116 and capture a suture held therein. The suture seating groove 306 of the saddle implant 112 is configured to align with the aperture 314 of the distal eyelet 116 such that the suture material passing through the aperture 314 (i.e., from top to bottom of the cross section E) is captured between the projections 304a, 304b of the saddle implant 112 as the saddle implant 112 passes over the distal eyelet 116.

Figures 4A, 4B, 4C:
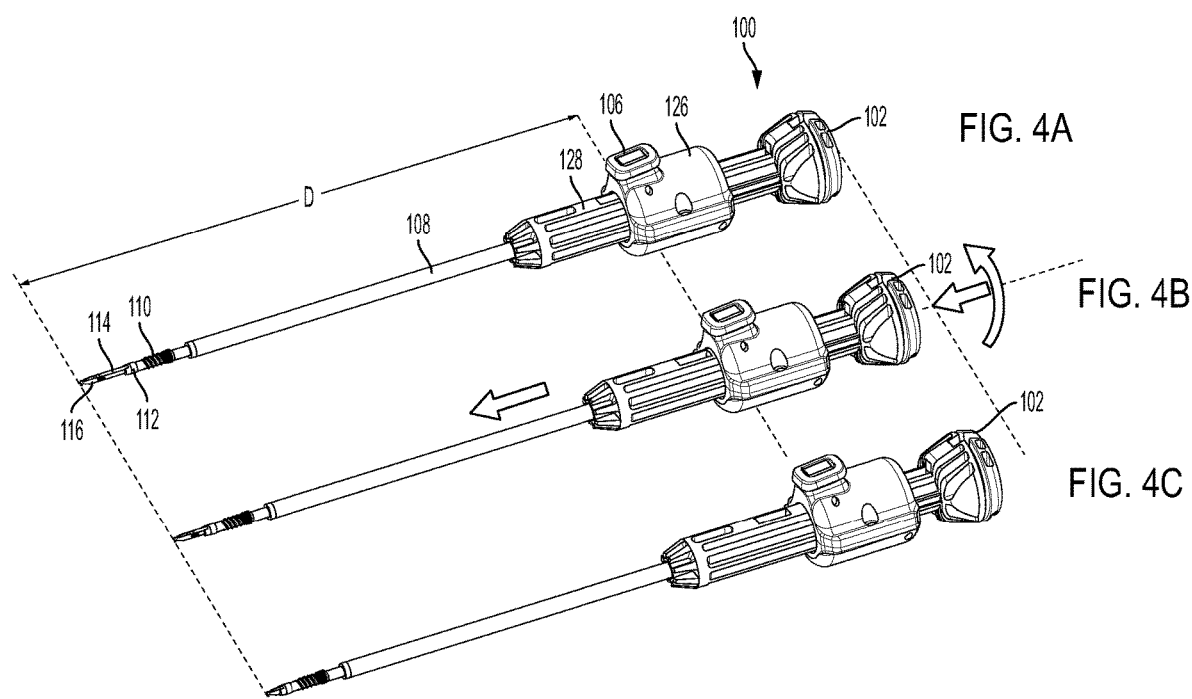
FIGS. 4A-4C are a series of perspective views of the knotless suture anchor fixation system of FIG. 1A during the process of inserting the suture anchor and saddle implant.

FIG. 4A is a front view of the knotless suture anchor fixation system of FIG. 1A at a starting position. In this starting position, suture material which is passed through the distal eyelet 116 is secured to cleat 106 by a surgeon. The surgeon may secure the suture material at a tension appropriate for the procedure being performed. The tension with which the suture material is secured to the cleat is substantially maintained throughout the insertion of the suture anchor 110. The maintenance of the tension of the suture material is accomplished because the cleat 106 and the distal eyelet 116 maintain a constant distance D from one another throughout the procedure.

After the suture material has been secured to cleat 106, the surgeon turns the knob 102 and begins to screw the suture anchor 110 into the bone hole. As the suture anchor 110 advances, the knob moves distally, to a second position, shown in FIG. 4B, and shortens the overall length of the knotless suture anchor fixation system 100. As the knob 102 moves distally, the distance D between the cleat 106 and the distal eyelet 116 remains constant. As such, the tension on the suture material secured to the cleat 106 is maintained. The outer handle 126 slides relative to the knob 102 as the toothed component turns with the knob 102. As the knob 102 is rotated, the inserter member 108 and the hex-shaped portion 200 are rotated and the inner shaft 114 is translated proximally. The suture anchor 110 seated on the hex-shaped portion 200 is rotated and the bone engaging surface features 312 engage the bone to secure the suture anchor 110 in the bone. A distal end of the suture anchor 110 contacts a base 302 of the saddle implant 112. As the suture anchor 110 is rotated, moving it distally into the bone hole, and the inner shaft 114 translates proximally, the saddle implant 112 moves distally into the bone hole.

As shown in FIG. 4C, as the knob 102 is turned further, the outer handle 126 and the inner shaft 114 continue to translate proximally. The inserter member 108 continues to rotate and drive the suture anchor 110 into the bone hole. As the inner shaft 114 retracts, the saddle implant 112 moves toward the distal eyelet 116. The suture seating groove 306 of the saddle implant 112 maintains alignment with the aperture 314 of the distal eyelet 116 such that as the saddle implant 112 passes over the distal eyelet 116, the suture material passing through the distal eyelet extends between the two projections 304a, 304b of the saddle implant 112. The tension on the suture material is maintained as distance D continues to be maintained throughout the insertion process. The knotless suture anchor fixation device 100 is at its shortest configuration when the outer handle 126 is at a third position in FIG. 4C wherein the inner shaft 114 and distal eyelet 116 are moved to their most proximal positions and the knob 102 is moved in its most distal position.

Figure 5A:
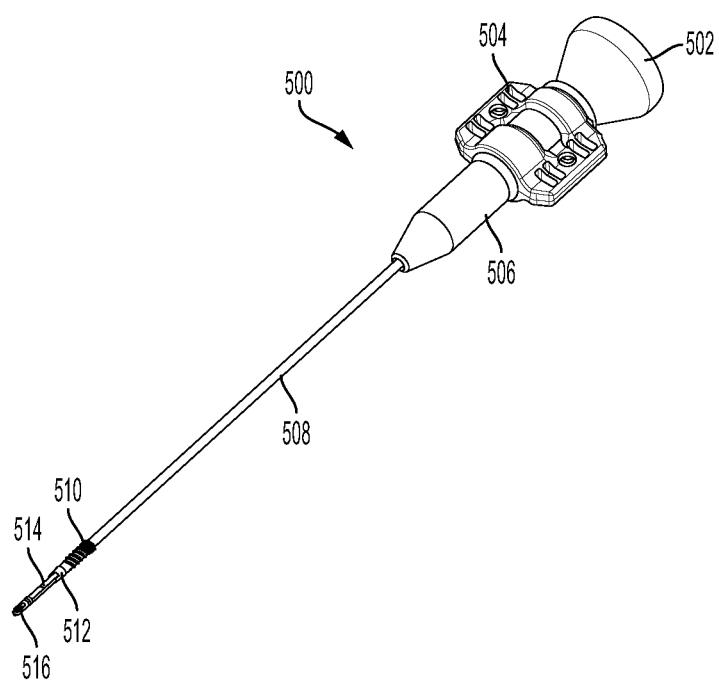
FIG. 5A is a perspective view of another embodiment of a knotless suture anchor fixation system.
Figure 5B:
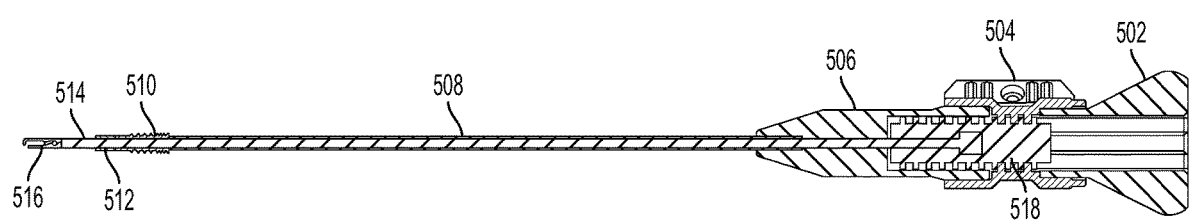
FIG. 5B is a cross-sectional view of the knotless suture anchor fixation system of FIG. 5A.
Figure 6:
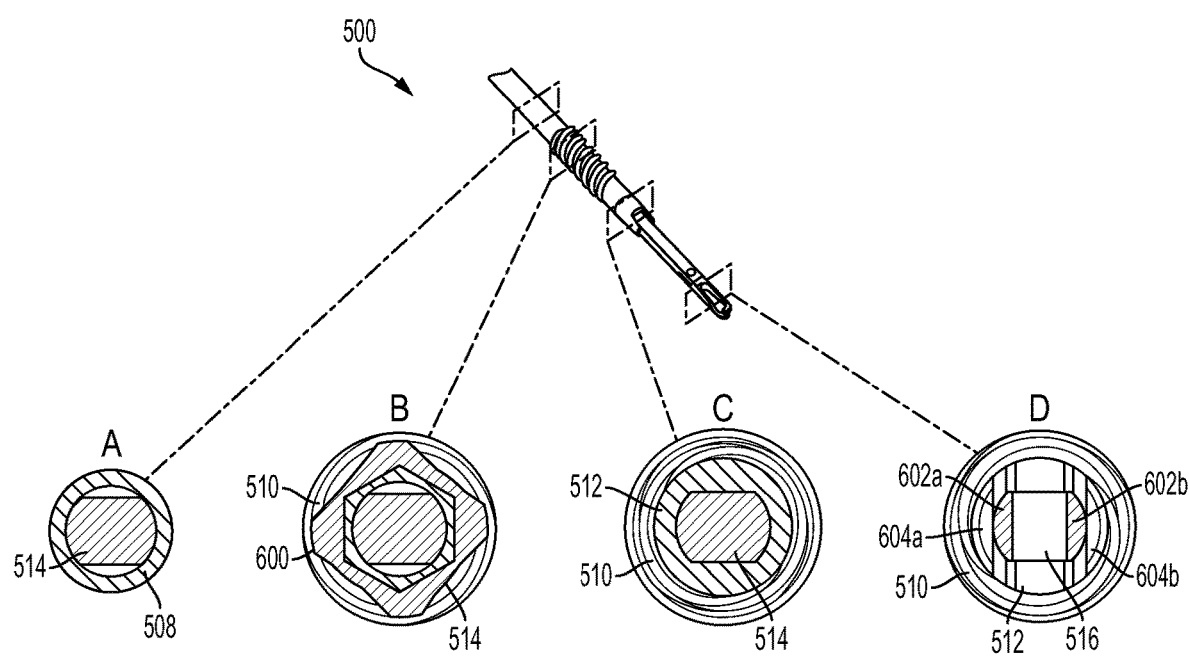
FIG. 6 is a perspective view and series of cross-sections of a distal portion of the knotless suture anchor fixation system of FIG. 5A.

FIGS. 5A-6 show another embodiment of a knotless suture anchor fixation system 500 (also called a "fixation device" or "fixation system" herein). The fixation system 500 includes a knob 502 for advancing a suture anchor 510 and a saddle implant 512 into a bone hole. The saddle implant 512 is seated on an inner shaft 514 and includes projections along curved sides of the inner shaft 514. A distal eyelet 516 is attached to a distal end of the inner shaft 514. The knotless suture anchor fixation system 500 has a cannulated inserter member 508 that rotates as the knob 502 is rotated. Referring to FIG. 5B, the inner shaft 114 extends from the distal eyelet 516 proximally into a toothed component 518.

FIG. 6 shows four cross sections, labeled A-D, of the knotless suture anchor fixation system 500 at varying positions along the device. Cross section A shows inserter member 508 and inner shaft 514. The inserter member 508 has a circular external profile and a circular internal profile. The inner shaft 514 has two curved sides and two flat sides that alternate to form a flat-curved-flat-curved external profile. The flat-curved-flat-curved profile is an aligning feature of the inner shaft 514 that allows for slidable engagement of the saddle implant 512. The curved sides of the external profile of the inner shaft 514 allow the inner shaft 514 to rotate relative to the inserter member 508.

Cross section B is taken at a position where the suture anchor 510 sits on a hex-shaped portion 600 of the inserter member 508. The suture anchor 510 has a threaded external profile and a hexagonal inner profile. The hexagonal inner profile of the suture anchor 510 allows the suture anchor 510 to be driven by the hex-shaped portion 600 of the inserter member 508 when the inserter member 508 is rotated by rotation of the knob 502. The inner shaft 514 is configured to rotate relative to the hex-shaped portion 600 of the inserter member 508.

Cross section C is taken at a position where the saddle implant 512 is seated on the inner shaft 514. The base of the saddle implant 512 has a circular outer profile and a flat-curved-flat-curved internal profile that is an aligning features of the saddle implant 512 and corresponds to the external profile of the inner shaft 514 allowing for slidable engagement of the saddle implant 512 and the inner shaft 514. The corresponding profiles of the interior of the saddle implant 512 and the outer profile of the inner shaft 514 allow the suture anchor 510 to rotate to be driven into the bone hole while the saddle implant 512 and the inner shaft 514 do not rotate with the suture anchor 510. The corresponding profiles of the interior of the saddle implant 512 and the outer profile of the inner shaft 514 allows for the alignment of a suture seating groove with an aperture of the distal eyelet 516. The suture anchor 510 can be seen behind the saddle implant 512. A distal face of the suture anchor 510 abuts a proximal face of the saddle implant 512 such that force may be transferred between the suture anchor 510 and the saddle implant 512 to, in use, advance the saddle implant 512 into the bone hole ahead of the suture anchor 510.

Cross section D is taken at a position across the distal eyelet 516. The distal eyelet 516 has two arms 602a, 602b that extend distally within the same cross-sectional flat-curved-flat-curved profile of the inner shaft 514. Because the distal eyelet 516 has a cross-sectional profile that is no larger than the cross section of the inner shaft 514, the saddle implant 512 can slide over the distal eyelet 516 and receive the suture material. In cross section D, projections 604a, 604b on the saddle implant 512, which extend toward the distal eyelet, can be seen.

Figure 7:
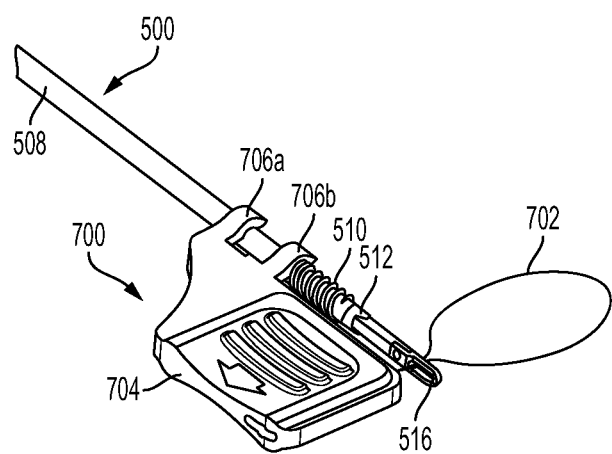
FIG. 7 is a perspective view of the distal portion of the knotless suture anchor fixation system of FIG. 5A with a threader tab installed thereon.

FIG. 7 is a perspective view of the distal portion of the knotless suture anchor fixation system of FIG. 5A with a threader tab 700 installed thereon. The threader tab 700 includes clips 706a, 706b that attach the threader tab 700 to inserter member 508 of the knotless suture anchor fixation system 500. The threader tab 700 also includes a suture loop 702 configured to be threaded with suture material. The suture loop 702 is configured to be flexible such that the suture loop 702 can be passed through the distal eyelet 516 and reform a loop shape after passing therethrough. The suture loop 702 may be made of any appropriate material including, but not limited to, metal, plastic, etc. The relatively large size of the suture loop 702 allows easy threading of the suture material through the suture loop 702. The threader tab 700 has a grip 704 including an indentation and ridges that are configured to be easily grasped by a surgeon performing the suture anchor fixation procedure to remove the threader tab 700 from the inserter member 508 or to hold and manipulate the position of the threader tab 700 during the procedure. Use of the threader tab 700 is shown in FIGS. 8A and 8B below.

Figure 8A:
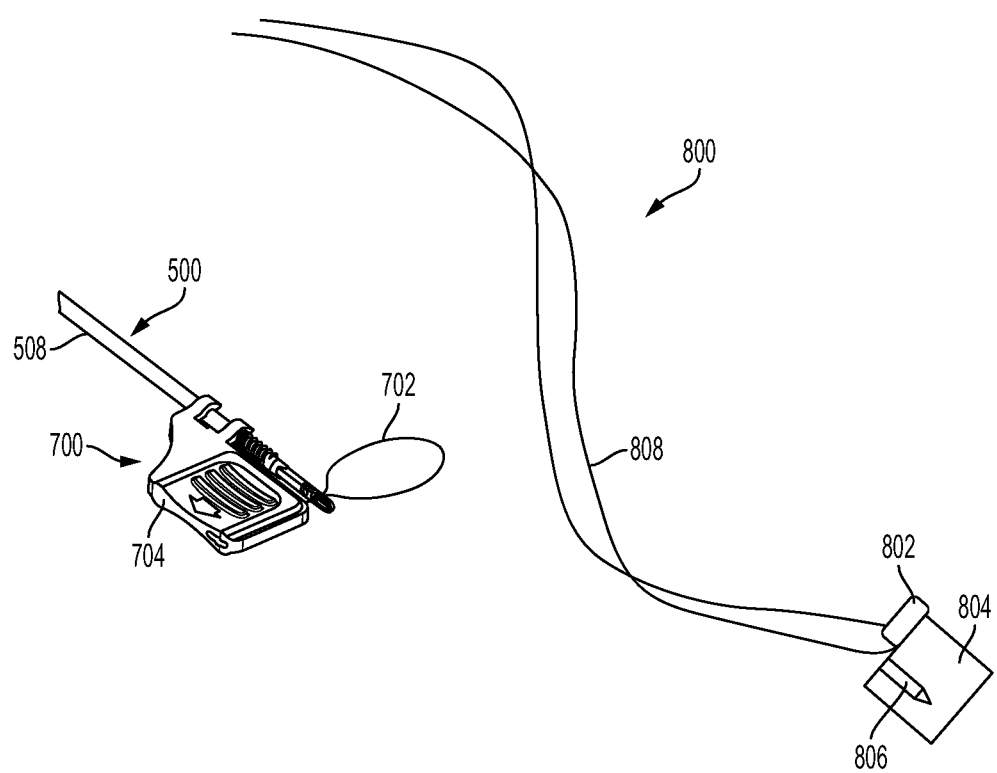
FIG. 8A is a perspective view of the knotless suture anchor fixation system of FIG. 5A with threader tab installed thereon and a bone hole created proximate to tissue to be repaired.

FIG. 8A is a perspective view 800 of a setup for a procedure for using the knotless suture anchor fixation system 500 of FIG. 5A to secure tissue 802 to bone 804. Although the procedure is generally applicable to the use of knotless suture anchor fixation system 100, the procedure is described with respect to system 500 for exemplary purposes. A bone hole 806 is created in bone 804 proximate to tissue 802 to be repaired. Suture 808 is passed through the tissue 802 to be repaired. The knotless suture anchor fixation system 500 is provided for the clinician to perform the repair procedure. The suture 808 is threaded through the suture loop 702 of the threader tab 700 and the threader tab 700 is removed from the inserter member 508.

Figure 8B:
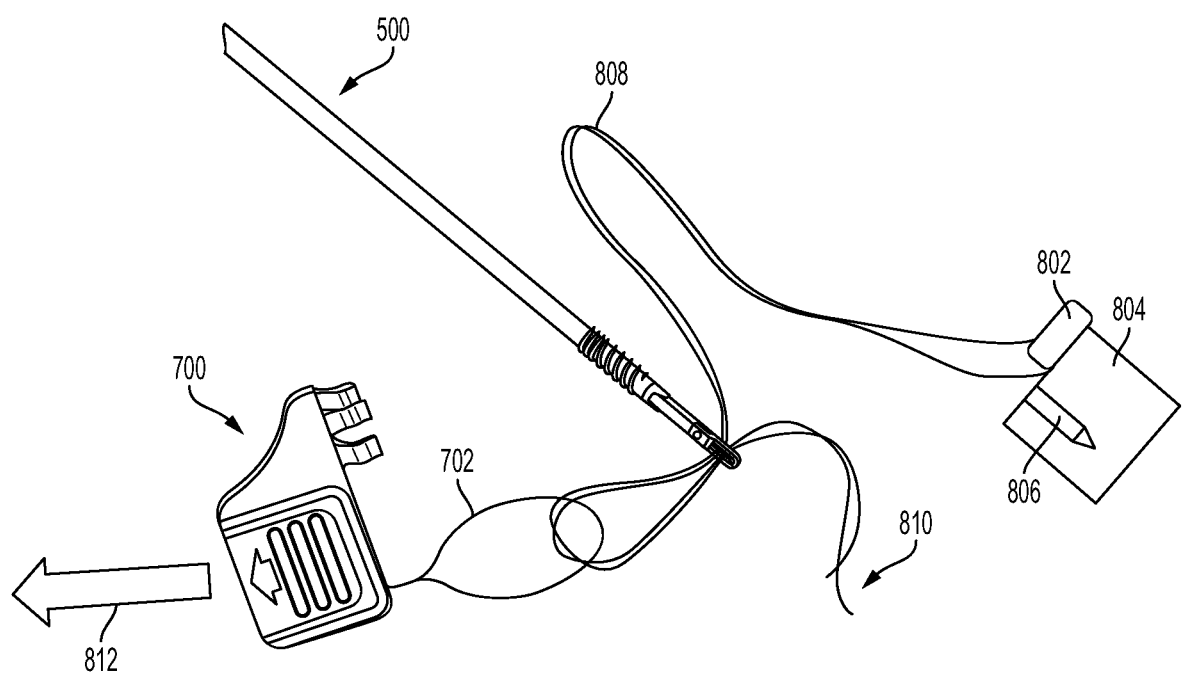
FIG. 8B is a perspective view of the knotless suture anchor fixation system of FIG. 5A with suture material attached to tissue threaded therethrough.

FIG. 8B is a perspective view of the knotless suture anchor fixation system 500 of FIG. 5A with suture 808 attached to tissue threaded through the threader tab 700 attached to the knotless suture anchor fixation system 500. By removing the threader tab 700 from the inserter member 508 of the fixation system 500 and pulling the suture loop 702 of the threader tab 700 through the distal eyelet, the suture 808 is also pulled through the distal eyelet 516. The threader tab 700 can be used to pull free ends 810 of the suture 808 through the distal eyelet 516, as shown by arrow 812.

Figure 8C:
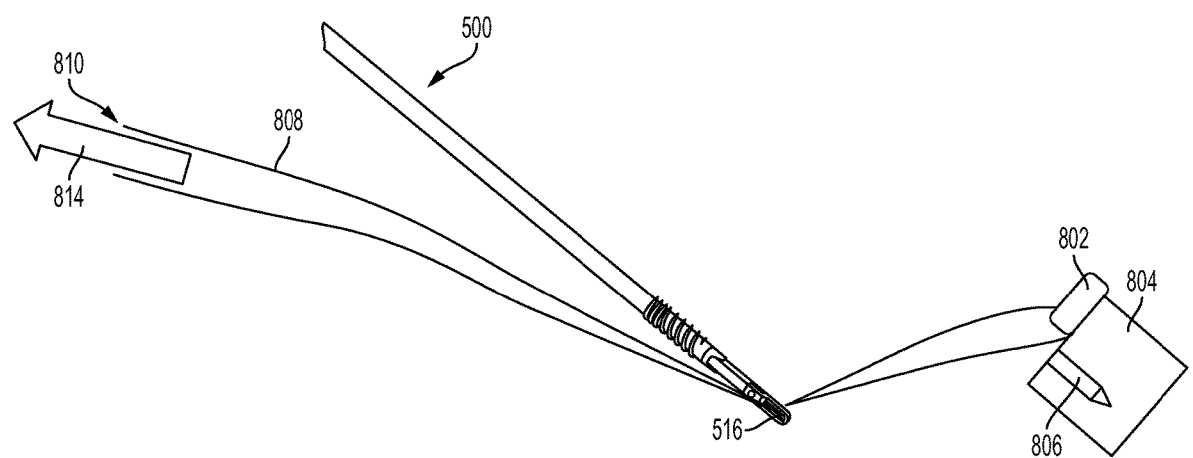
FIG. 8C is a perspective view of the knotless suture anchor fixation system of FIG. 5A with suture material pulled through the distal eyelet.
Figure 8D:
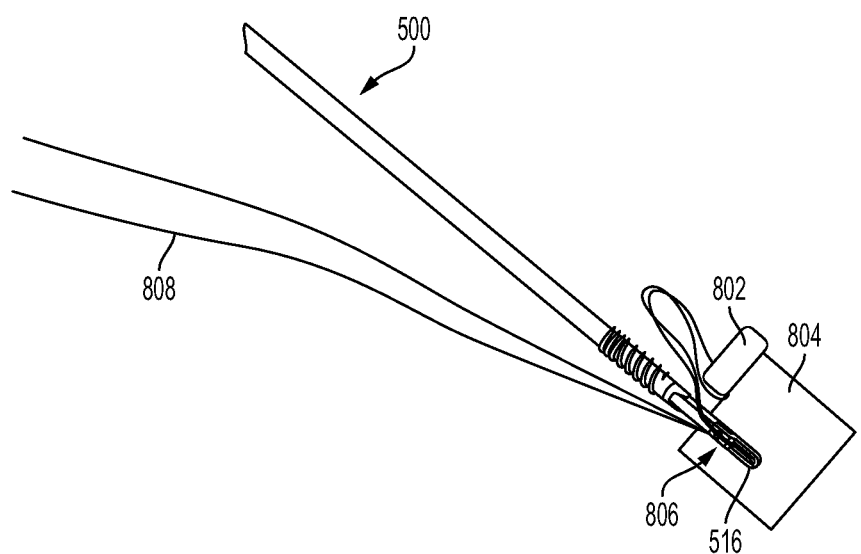
FIG. 8D is a perspective view of the knotless suture anchor fixation system of FIG. 5A with the distal portion thereof inserted into the bone hole.
Figure 8E:
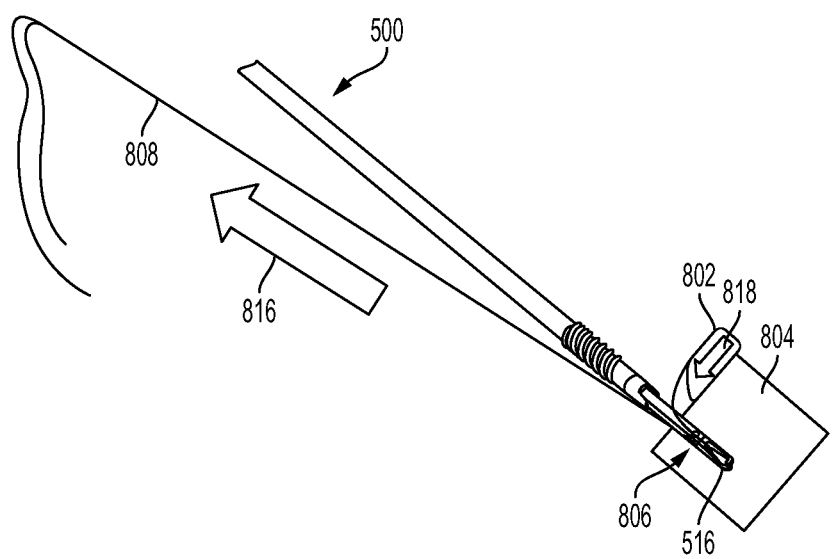
FIG. 8E is a perspective view of the knotless suture anchor fixation system of FIG. 5A with the distal portion thereof inserted into the bone hole with a desired suture tension applied.

FIG. 8C is a perspective view of the knotless suture anchor fixation system 500 of FIG. 5A with suture 808 pulled through the distal eyelet 516. After the clinician uses the threader tab 700, shown in FIGS. 8A-8B, to thread the suture 808 through the distal eyelet 516, the clinician pulls the free ends 810 of the suture 808 through the distal eyelet. FIG. 8D is a perspective view of the knotless suture anchor fixation system 500 of FIG. 5A inserted into the bone hole 806. The clinician inserts a distal end of the fixation device 500 into the bone hole 806 such that the distal eyelet 516 is positioned therein. The suture 808 extends from the tissue 802, down into the bone hole 806, through the distal eyelet 516, and back out of the bone hole 806 such that the free ends 810 are accessible and the suture 808 can be manipulated by the clinician. Referring to FIG. 8E, the clinician applies tension on the suture 808, represented by arrow 816 and, which pulls the tissue 802, represented by arrow 818, toward the bone hole 806. The clinician selects an appropriate tension for the procedure to fix the tissue at the desired location proximate to the bone hole 806. In procedures using an embodiment of the knotless suture anchor fixation system such as the fixation device 100 of FIG. 1A that includes a cleat 106, the clinician fixes the suture 808 to the cleat 106 to maintain the selected tension during the remainder of the procedure. In some instances, the clinician may align the aperture of the distal eyelet 516 such that the suture material proceeds through the aperture at a desired angle relative to the tissue 802. For example, one of the flat surfaces of the inner shaft 514 may be positioned to face the tissue 802 such that the suture material may proceed from the tissue 802 and into the aperture in a generally straight line.

After the desired tension is applied to the suture 808, the inserter member 508 of the knotless suture anchor fixation system 500 is rotated by rotating the knob 502. The rotation is represented by arrow 820. The rotation causes bone engaging threads on the suture anchor 510 to grab the bone and advance the suture anchor 510 into the bone hole 806. As the suture anchor 510 is advanced distally via rotation of the inserter member 508, a distal face of the suture anchor 510 transmits force to the saddle implant 512 to advance the saddle implant 512 into the bone hole 806. The saddle implant 512 has a flat proximal surface that abuts the distal face of the suture anchor 510. Unlike the suture anchor 510, the saddle implant 512 does not rotate as it moves distally into the bone hole 806. The saddle implant 512 is seated on the inner shaft 514 and is configured to slide relative thereto due to the corresponding profiles of the inner lumen of the saddle implant 512 and the exterior of the inner shaft 514.

Figure 8F:
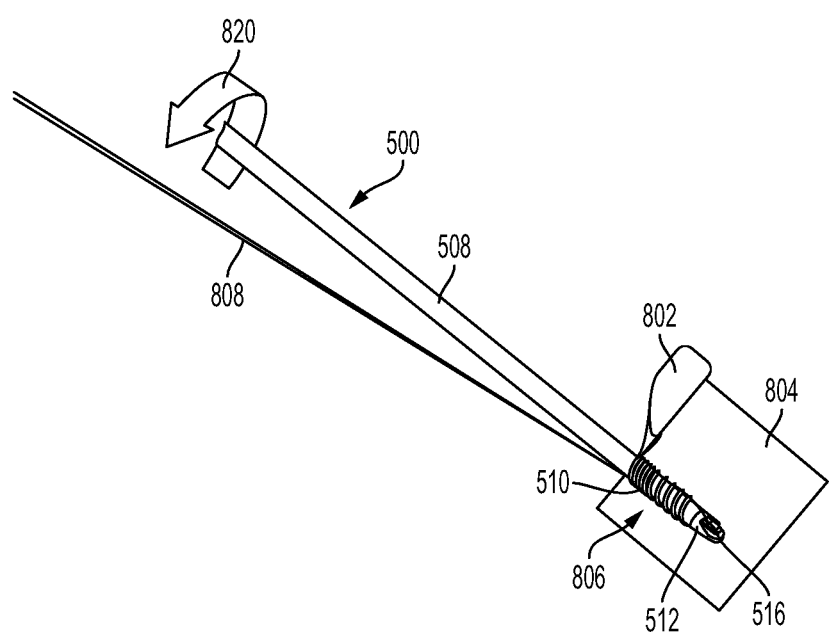
FIG. 8F is a perspective view of the cannulated suture anchor and saddle implant of the system of FIG. 5A with the suture anchor being driven into the bone hole.

As the saddle implant 512 advances over the distal eyelet 516, shown in FIG. 8F, the suture 808 is positioned between the projections 604a, 604b of the saddle implant 512 (shown in FIG. 6). As the saddle implant 512 continues to advance over the distal eyelet 516, the suture 808 contacts the base of the saddle implant 512 (see base 302 of saddle implant 112 in FIG. 3A). As the distal eyelet 516 is moved proximally with the base of the saddle implant 512 contacting the suture 808 within the suture seating groove, the suture 808 moves distally within the aperture of the distal eyelet 516.

Figure 8G:
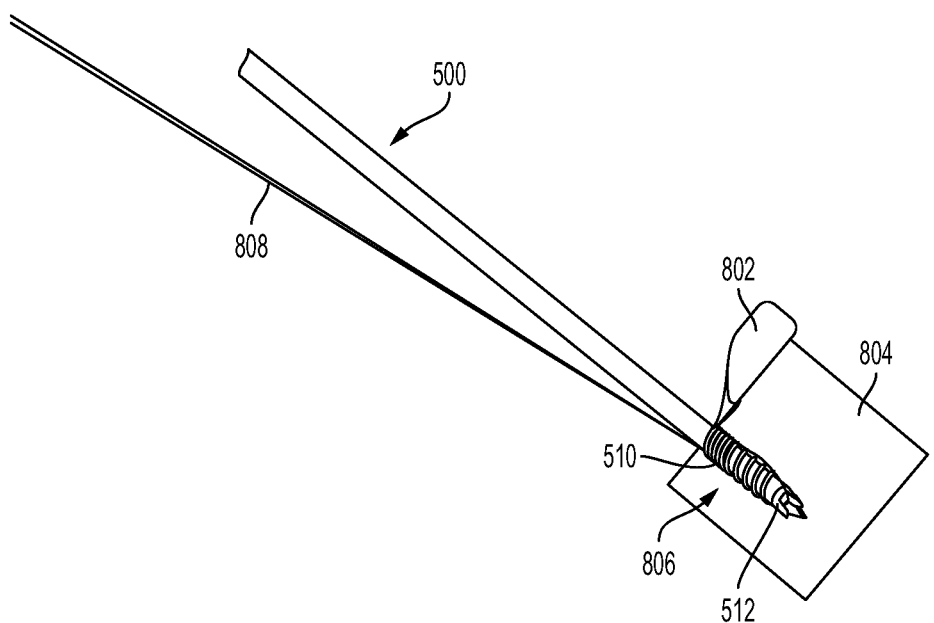
FIG. 8G is a perspective view of the cannulated suture anchor and saddle implant of the system of FIG. 5A in the bone hole after the central shaft of the inserter tool is removed.

As the arms 602a, 602b of the distal eyelet 516 move proximally with the retraction of the inner shaft 514, as shown in FIG. 8F, a position is reached wherein the ends of the arms 602a, 602b are even with the base of the saddle implant 512. The arms 602a, 602b of the distal eyelet 516 begin to flex as the suture 808, which is contacting the base of the saddle implant 512, begins to exert a force on the arms 602a, 602b of the distal eyelet 516 as the distal eyelet 516 retracts through the cannula of the saddle implant 512. The arms 602a, 602b will reach a point where the force exerted on the arms 602a, 602b by the suture 808 is enough to flex the arms 602a, 602b wide enough such that the suture 808 passes therebetween and is released. As shown in FIG. 8G, the suture 808 is retained in the suture seating groove of the saddle implant 512 and secured in the bone hole by the suture anchor 510. The suture anchor 510 maintains tension on the suture 808 to hold the tissue 802 in place.

Figure 8H:
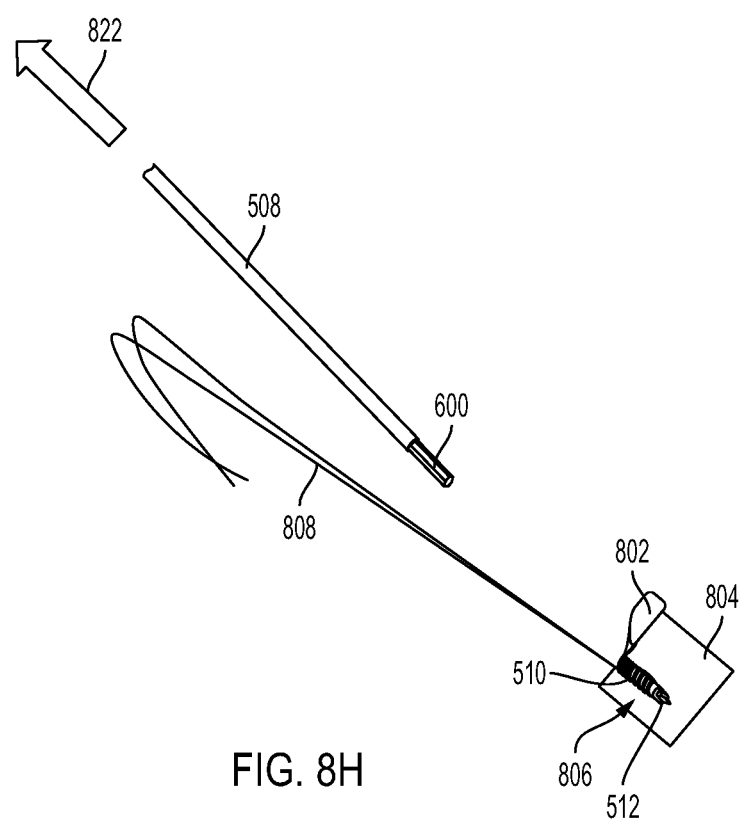
FIG. 8H is a perspective view of the fixed cannulated suture anchor and saddle implant of the system of FIG. 5A after the inserter tool is removed.

Referring to FIG. 8H, after fixation of the suture anchor 510, saddle implant 512, and suture 808 in the bone hole 806, the remainder of the knotless suture anchor fixation device 500 is removed from the bone hole, as represented by arrow 822. Free ends of the suture 808 can be trimmed by the clinician as desired.

In other embodiments, various combinations of the handles and shafts disclosed herein may be used. For example, the handle 104 of the embodiment of the fixation device 100 shown in FIG. 1A may be combined with inserter member 508 and inner shaft 514 to create an alternative configuration of a knotless suture anchor fixation device. In another example, the handle 504 of the embodiment of the fixation device 500 shown in FIG. 5A may be combined with inserter member 108 and inner shaft 114 to create another alternative configuration of a knotless suture anchor fixation device.

One skilled in the art will appreciate further features and advantages of the devices, systems, and methods based on the above-described embodiments. Accordingly, this disclosure is not to be limited by what has been particularly shown and described, except as indicated by the appended claims. All publications and references cited herein are expressly incorporated herein by reference in their entirety for all purposes.

The present disclosure has been described above by way of example only within the context of the overall disclosure provided herein. It will be appreciated that modifications within the spirit and scope of the claims may be made without departing from the overall scope of the present disclosure.

What is claimed is:

1. A suture anchor system, comprising:
   a cannulated suture anchor having at least one driven feature and at least one bone-engaging feature disposed on an external surface thereof;
   a cannulated inserter member having a lumen extending therethrough and configured to be removably disposed within a lumen of the suture anchor, the inserter member having at least one drive feature disposed thereon that is configured to engage the driven feature of the suture anchor;
   a saddle implant distal to the suture anchor, the saddle implant comprising at least one aligning feature disposed in a lumen thereof, a distal end having a suture seating groove, wherein the saddle implant is configured to be mounted distally adjacent to the suture anchor and to be rotatable relative to the suture anchor; and
   an inner shaft configured to be removably disposed within the lumen of the inserter member, the inner shaft having at least one aligning feature on an external surface thereof and a distal eyelet fixed at the distal end thereof, the distal eyelet having an opening and being configured to be rotationally fixed relative to the saddle implant and to be rotatable relative to the suture anchor.

2. The suture anchor system of claim 1, wherein the aligning feature of the saddle implant comprises two flat and two rounded sides.

3. The suture anchor system of claim 1, wherein the suture seating groove is a saddle-shaped feature.

4. The suture anchor system of claim 3, wherein the saddle shaped feature has a base and two distally extending projections, each distally extending projection having a flat distal-facing surface.

5. The suture anchor system of claim 1, wherein the saddle implant is removably mountable on the inner shaft.

6. The suture anchor system of claim 1, wherein the eyelet is defined by two arms.

7. The suture anchor system of claim 6, wherein the arms have a tapered shape.

8. The suture anchor system of claim 1, wherein the eyelet is formed of a flexible material.

9. The suture anchor system of claim 1, wherein the eyelet is removable through the lumens of the saddle implant and the suture anchor.

10. The suture anchor system of claim 1, wherein an external profile of the eyelet corresponds to a geometry of an inner surface of the saddle implant and an outer surface of the inner shaft.

11. The suture anchor system of claim 1, wherein the eyelet is configured to release sutures upon retraction of the inner shaft.

12. The suture anchor system of claim 1, further comprising a handle with multiple pieces.

13. The suture anchor system of claim 12, further comprising a cleat on one of the multiple pieces.

14. The suture anchor system of claim 13, wherein the cleat maintains a predetermined distance from the eyelet during insertion.

15. The suture anchor system of claim 1, further comprising a threader tab.

16. The suture anchor system of claim 15, wherein the threader tab comprises a clip configured to be attached to the inserter member.

17. The suture anchor system of claim 1, wherein the bone-engaging feature disposed on the external surface of the cannulated suture anchor comprises threads.

18. The suture anchor system of claim 17, wherein the threads comprise two different thread configurations.

* * * * *